(12) United States Patent
Ginzboorg (10) Patent No.: US 6,347,077 B1
(45) Date of Patent: Feb. 12, 2002

(54) TRAFFIC MEASUREMENT IN A COMMUNICATION SYSTEM

(75) Inventor: Philip Ginzboorg, Espoo (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/068,626
(22) PCT Filed: Nov. 8, 1996
(86) PCT No.: PCT/FI96/00606
  § 371 Date: May 7, 1998
  § 102(e) Date: May 7, 1998
(87) PCT Pub. No.: WO97/17783
  PCT Pub. Date: May 15, 1997

(30) Foreign Application Priority Data

Nov. 9, 1995 (FI) .................................. 955406

(51) Int. Cl.$^7$ .................. G01R 31/08; G06F 11/00; G08C 15/00; H04J 1/16
(52) U.S. Cl. ........................ 370/230; 370/235
(58) Field of Search ............... 370/389, 395, 370/396, 398, 229, 230, 231, 232, 235

(56) References Cited

U.S. PATENT DOCUMENTS

| | | | |
|---|---|---|---|
| 4,224,479 A | * 9/1980 | Crawford | 379/134 |
| 4,244,279 A | 1/1981 | Stewart et al. | |
| 4,629,830 A | * 12/1986 | Daisenberger | 340/825.03 |
| 5,060,258 A | 10/1991 | Turner | |
| 5,138,607 A | 8/1992 | Thiebaut et al. | |
| 5,317,570 A | 5/1994 | Ochiai | |

FOREIGN PATENT DOCUMENTS

| | | |
|---|---|---|
| EP | 0 674 458 A1 | 9/1995 |
| JP | 5-344142 | 12/1993 |
| WO | WO 90/00331 | 1/1990 |
| WO | WO 93/18600 | 9/1993 |
| WO | WO 94/11972 | 5/1994 |
| WO | WO 97/17784 | 5/1997 |

OTHER PUBLICATIONS

CCITT Blue Book, "ITU–T Recommendations E.412, Network Management Controls", p. 1–16.
CCITT Blue Book, "ITU–T Recommendation Q.542, Digital Exchanges", p. 1–21.
Raif O. Onvural, "Asynchronous Transfer Mode Networks, Performance Issues, Leaky Bucket", Chapter 4.5.1, p.160–165.

* cited by examiner

Primary Examiner—Ajit Patel
Assistant Examiner—Bob A. Phunkulh
(74) Attorney, Agent, or Firm—Altera Law Group, LLC (57) ABSTRACT

The invention relates to a method and an apparatus for measuring traffic in a communication system. Information corresponding to traffic units to be forwarded, such as cells, is directed to a number of parallel traffic gapping gates ($G_1 \ldots, G_n$) which make a gap or pass decision on individual traffic units, and the distribution concerning frequency of occurrence of the traffic units is estimated by simultaneously calculating the estimates of the relative frequency of occurrence on several value ranges. In order to obtain in a simple manner an accurate view on the traffic, the estimate of an individual value range is calculated on the basis of the difference between the numbers of decisions made during a specific period by the gapping gates corresponding to the value range in question.

17 Claims, 9 Drawing Sheets

FIG. 14 ion System

FIELD OF THE INVENTION

The invention relates to a method for measuring traffic in a communication system, the method comprising the steps of directing information corresponding to traffic units to be forwarded, such as cells, to a number of parallel traffic gapping gates ($G_1$, ..., $G_n$) which make a gap or pass decision on individual traffic units, and estimating the distribution concerning frequency of occurrence of the traffic units by simultaneously calculating the estimates of the relative frequency of occurrence on several value ranges. The solution according to the invention is particularly intended for measuring cell traffic in an ATM network, but it is applicable in connection with other kind of traffic as well, for example in calls, as will be disclosed below. Due to the many operational environments, the cells, packets, calls etc entities transferred in the system will below be referred to with a general term "traffic unit".

BACKGROUND OF THE INVENTION

The call control methods based on traffic measurements are based on the fact that it is difficult for a user to describe accurately the nature of the traffic in advance. For example, the average bit rate of a compressed video signal is very difficult to determine in advance. In fact, the user may have to give the traffic parameters (such as cell maximum rate and cell average rate) values higher than actual, because the exact characteristics of the traffic are unknown prior to establishing a connection. Consequently, the connection is allocated more resources than needed in the network, possibly resulting in a lower degree of utilization in the network. The inaccurate description given by the user is compensated for by carrying out measurements from actual traffic. By means of these measurements, the utilization degree of the network resources can be improved. In fact, the most efficient traffic control methods are based on measurements performed from actual traffic.

An efficient method of studying traffic is to measure a so-called histogram information from the traffic. The efficiency is a result of the histogram containing a lot of information on the traffic stream. In order to facilitate understanding the description below, these histograms are first briefly discussed.

Figure 1:
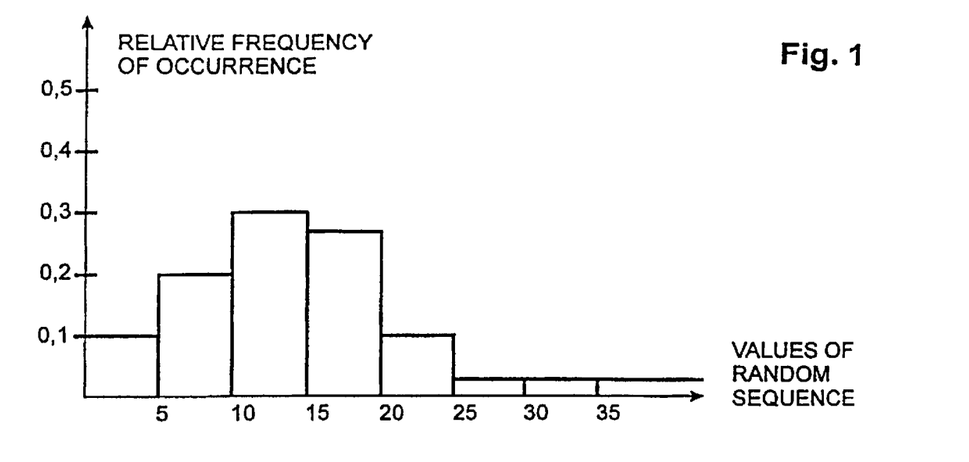
FIG. 1 illustrates a histogram, with information corresponding thereto being gathered by the method of the invention.

A histogram refers to a bar chart illustrating the frequency distribution of a quantity, in which the width of the bar represents a specific value range and the height of the bar represents the frequency of the values within the value range in question. Thus, a histogram illustrates how the values of a specific quantity are distributed among all possible values. If the quantity is a random variable r (which may represent e.g. the frequency of occurrence of incoming cells at the input of a device, or the rate of incoming calls on a specific trunk line), the histogram is an estimate of r's probability density function f. FIG. 1 shows a histogram in which the height (0.1) of the first bar is an estimate of the subsequent value of the random variable to be between zero and five, the height (0.2) of the next bar is an estimate of the subsequent value of the random variable to be between five and ten, etc. By computing a sum of heights up to the bar whose x coordinate is greater than X, an estimate of r's probability distribution function F will be obtained at the point r=X. For example, the sum of the two leftmost bars (0.1+0.2=0.3) is an estimate of the subsequent value of the random variable to be lower than or equal to ten.

For a discrete random variable, the probability density function f and the probability distribution function F are determined as follows:

$$f(X) = P\{\text{any } r_i = X\}, \quad i = 0, 1, 2, \ldots$$
$$F(X) = P\{\text{any } r_i \leq X\} = \sum_{r_i \leq X} f(r_i)$$

If the functions f and F are known, then we know almost everything there is to know about the behaviour of the random variable. In practice, however, this is impossible because in such a case we would need to know not only the previous values of the random variable sequence but also its future values. However, this is not possible because the traffic originates from an external source which is independent of the measuring device and whose behaviour cannot be known in advance. In addition, the functions f and F may be functions of time (that is, they may vary with time).

In the method according to the present invention, traffic distribution is estimated by gathering information corresponding to a histogram from either all or just some of the previous values of the random variable. (It should be noted that a histogram is usually understood to refer to a graphic representation. For this reason, reference in connection with the present invention is usually made to information corresponding to a histogram because the measuring information gathered does not have to be in a graphic form.) In the description below, the letter h denotes an (empirical) estimate of the probability density function f and the letter H denotes an (empirical) estimate of the probability distribution function F, i.e. h≈f and H≈F.

Calculating the histogram information of the frequency of occurrence (i.e. arrival rate) for the traffic units forms the basis of various traffic analyses, therefore also establishing the core of many different implementations. Examples of such implementations utilizing traffic measurements are Connection Admission Control and bandwidth allocation in fast packet networks, particularly in the ATM networks. Traffic measurements may also be carried out in order for a specific transfer device or a part thereof to be optimized for precisely a specific type of traffic. For example, buffer size should be big enough to buffer most of the incoming traffic.

Figure 2:
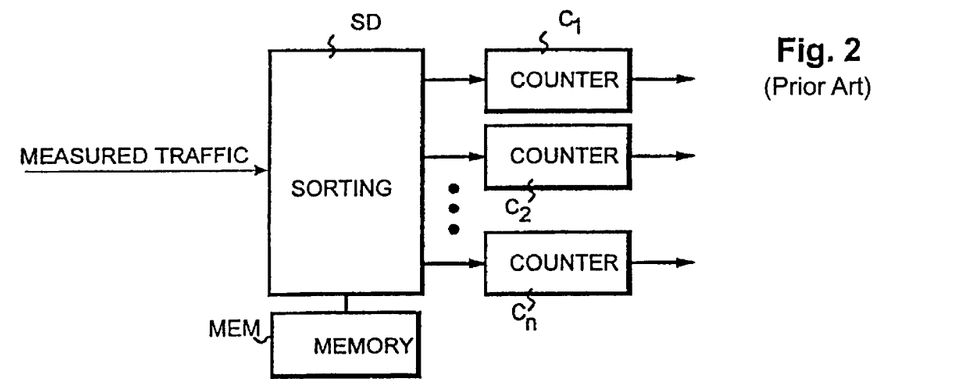
FIG. 2 illustrates a prior art method of gathering histogram information from traffic, FIGS. 3a . . . 3c illustrate some prior art methods for modifying what was shown in FIG. 2 into a measurement procedure by means of which traffic behaviour can be estimated on a long-term basis.

FIG. 2 illustrates a typical solution which can be used to measure the estimate h of the probability density function f. Measured traffic or corresponding information (e.g. a pulse sequence in which every pulse corresponds to an incoming traffic unit) is fed to a sorting device SD which calculates a momentary arrival rate r. This is obtained by taking an inverse value of the difference between time $t_1$ (i.e. the current time) of the arriving traffic unit and time $t_2$ of the preceding traffic unit, i.e. $r=1/(t_1-t_2)$. This value is calculated at every arriving traffic unit. (If the calculation does not utilize an inverse value but the difference $t_1-t_2$, the distribution of time between successive traffic units is estimated instead of the distribution of arrival rate.) The actual calculation is carried out by means of counters $C_1$, ..., $C_n$, of which there is one per each histogram bar, i.e. one per each "frequency band". For example, to evaluate the information of FIG. 1, eight counters are required (the first between zero and five, the second between five and ten, etc, and the last counter between thirty-five and infinity.) Having found out the instantaneous arrival rate, the sorting device SD must decide on which histogram bar x-axis range the result belongs. For this purpose, it has, stored in its memory (denoted by reference mark MEM), information on which x-axis range matches which counter $C_1, \ldots, C_n$. Thus, the sorting device compares the result it calculated to the information stored in the memory, and following this increments the counter which matches the "frequency band" on which the result belongs. In this manner, the calculation results of the counters provide the estimate h of the probability density function. At the beginning of the measurement, the counters were zeroed. Following the measurement, the counter values will be stored and the counters zeroed, after which the next measurement may follow.

Figure 3A:
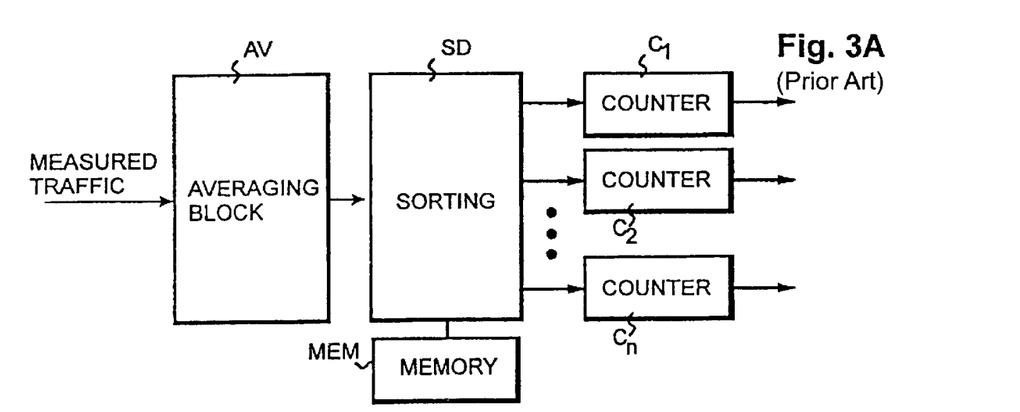
Figure 3B:
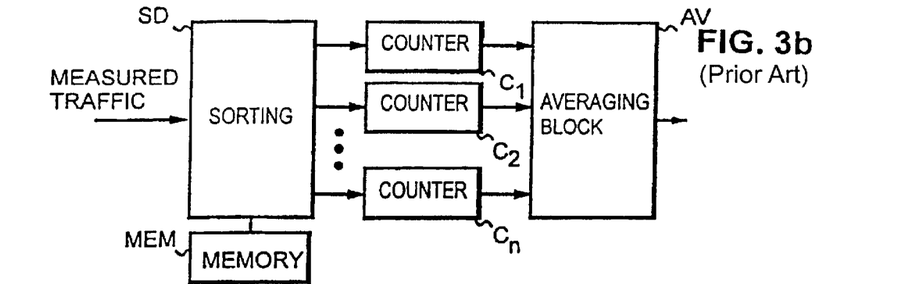
Figure 3C:
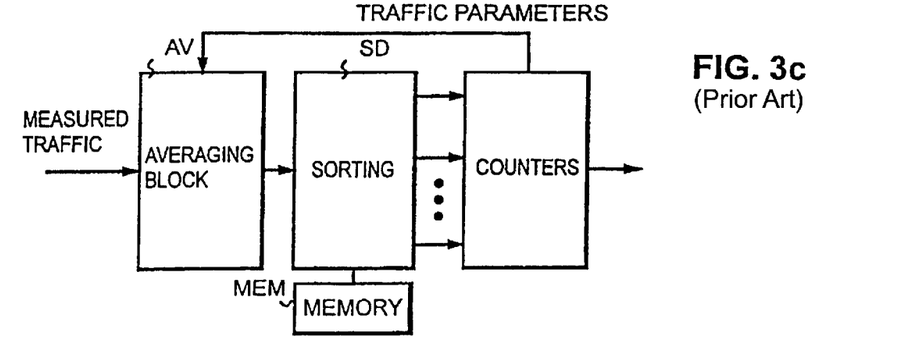

The way described above will provide an instantaneous pattern or instantaneous distribution of the traffic. However, momentary minor fluctuations are usually of no interest, but instead we would like to evaluate a long-term behaviour of the traffic, because such an evaluation will give a more accurate view on the behaviour of the traffic. This is carried out by averaging the measurements in some way, in order to smooth any momentary fluctuations. The simplest way to achieve this is to add an averaging block before the apparatus of FIG. 2. This alternative is illustrated in FIG. 3a, in which said block is denoted by reference mark AV. A problem encountered in association with this solution is how to choose the averaging factor; for example, how many traffic units to take into account, or how long the time window should be. Generally speaking, it can be noted that the correct averaging factor depends on how the incoming traffic fluctuates around its current mean, which means that it is better to position the averaging block after the estimation block (as in FIG. 3b), or to feed traffic parameters to the averaging block via a feed-back loop (as in FIG. 3c) so as to maintain continuous and efficient averaging. In this case, the information measured has to be stored in the sorting block so that feed-back parameters could be formed from it.

As is apparent from the above, averaging makes the device more complicated; ever more parameters have to be decided upon. Efficient estimation also requires adding new components in the measuring device for traffic measurements.

BRIEF DESCRIPTION OF THE INVENTION

It is an object of the present invention to obviate the drawback disclosed above by providing a new type of method by means of which it is possible to obtain in a simple manner an accurate estimate of the long-term behaviour of traffic (and, if necessary, also of momentary traffic rate distribution).

This object is achieved by the solutions according to the invention, of which the method is characterized by calculating the estimate of an individual value range on the basis of the differences between the number of decisions made by the gapping gates corresponding to the value range in question during a specific time interval. The invention also relates to an arrangement for measuring traffic in a communication system, the arrangement comprising a number of parallel gapping gates $(G_1, \ldots, G_n)$, each coupled with information corresponding to traffic units to be forwarded, and each gapping gate comprising a decision-making means (DM) for making a pass or gap decision on a traffic unit, such as a cell, forwarded within the system, whereby a pass decision indicates accepting the traffic unit as traffic fulfilling predetermined criteria, and a clock means (CLK) for determining the time of occurrence for each traffic unit. The inventive arrangement for measuring traffic is characterized in that the arrangement further comprises a calculating means for calculating the differences between the number of decisions made by single gapping gates within a specific period.

The idea of the invention is to use, for traffic measurements, several such parallel devices which are used for traffic limiting and which have the averaging functions described above built-in in the limiting operation they carry out. On the basis of the difference between the number of pass and/or gap decisions by these limiting devices the estimates h and H described above (or at least one of them) are calculated. The measurement is thus carried out with the devices in question without limiting the traffic stream in any way. The limiting can be carried out at a later stage, too, but performing it is independent of the measuring method of the invention. Hence, the measuring utilizes the same pass and/or gap decisions as employed by the gapping gate even when it is used for traffic filtering.

By employing the solution according to the invention, traffic can be measured with filters that are provided in e.g. an ATM switching device in any case. Therefore, for the implementation of the present invention, we need to connect existing devices in a new way so that they can be used in measuring histogram information from the traffic.

By means of the solution according to the invention, it is possible in a simple way to obtain an accurate profile of the traffic offered, the profile in turn being applicable to many purposes. One of such advantageous useful targets is to develop the flow control procedures of the ATM network connections on the basis of the traffic profile which the invention provides more accurately than before.

BRIEF DESCRIPTION OF THE DRAWINGS

In the following, the invention and its preferred embodiments will be described in more detail with reference to the examples of FIGS. 4–14 in the accompanying drawings, in which.

DETAILED DESCRIPTION OF THE INVENTION

Because the invention can utilize prior art traffic gapping or filtering methods, the following will give a short description of these.

The so-called call gapping method (the term is in use in several international standards, such as the CCITT Blue Book, Recommendation E.412, §3.1.1.2 and Recommendation Q.542, §5.4.4.3) is a rate-based traffic control method which limits the amount of traffic, i.e. the number of calls, so that there is a specific maximum for the number of calls to be allowed to pass within a time unit. Such a method has been described not only in the aforementioned standards but also e.g. in U.S. Pat. No. 4,224,479.

Figure 4:
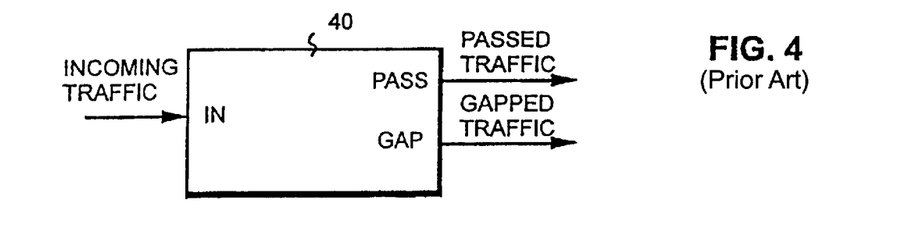
FIG. 4 shows a diagram of a gapping gate which gaps traffic according to a prior art gapping method.

A device operating according to the call gapping method could be represented by a gapping gate 40 illustrated in FIG. 4, the gate having one input denoted by the reference mark IN, and two outputs denoted by the reference marks PASS and GAP. In the gate, there is stored in advance a gapping parameter U which represents a specific number of traffic units per time unit (e.g cells or calls per second). The incoming traffic units are directed to the gapping gate input IN and the passed traffic units are forwarded from the output PASS. The gapping gate limits the frequency (frequency of occurrence) of the traffic units so that the amount of passed traffic within a time unit does not exceed the aforementioned gapping parameter U (traffic units per second). In case the amount of incoming traffic within a time unit exceeds the value U, the gapping gate directs some of the traffic units to the output GAP so that the rate of the output traffic from the port PASS is not higher than U. The traffic units obtained at the output GAP can be processed further in many ways, but that is not within the scope of the present application. In practise, the gapping gate can be implemented e.g. with a short program capable of reading the device clock and making gap decisions on the basis of that.

In the aforementioned U.S. Pat. No. 4,224,479 the gapping gate operates so that there is a shortest possible interval, e.g. 0.1 seconds, between two successive calls. (The gapping parameter stored in the gate may therefore also define the shortest allowed interval I, referred to as a gapping interval, between two successive calls, which is basically the same, because the gapping parameters in question are each other's inverse values, i.e. U=1/I.) The gapping gate stores the start time of the latest passed call. If the difference between the arrival time of a new call and the stored start time is shorter than the aforementioned shortest possible interval, the call will be gapped. If the difference at least equals the aforementioned interval, the call will be passed and the start time of the latest passed call will be updated to correspond to the current time.

Figure 5:
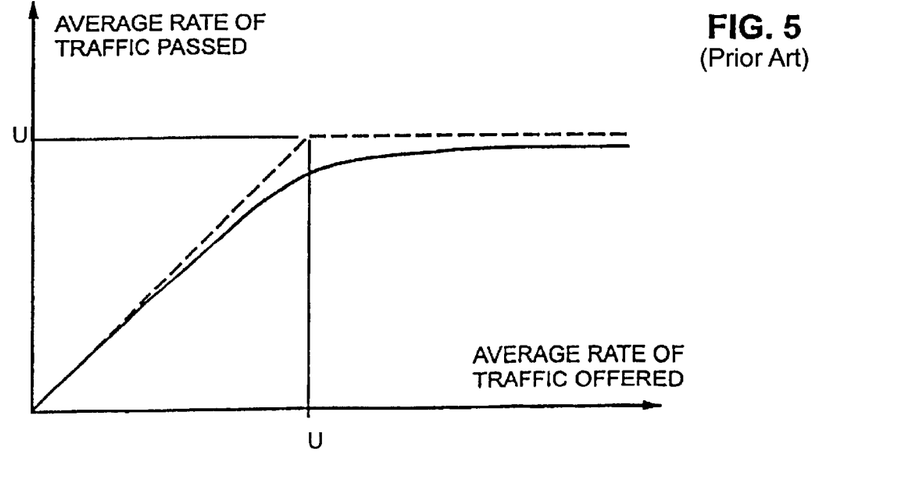
FIG. 5 illustrates the operation of the gate illustrated in FIG. 4.

The operation of the call gapping method is illustrated by FIG. 5. When the amount of average incoming traffic (depicted on the horizontal axis) is lower than the aforementioned maxim U, no gapping takes place (in an ideal case). When the average amount of the traffic offered exceeds the value in question, the gapping gate will gap some of the calls (by directing them to the output GAP) whereby the amount of traffic forwarded (depicted on the vertical axis) is U. The ideal case is represented by a broken line and a practical case by a solid line. In practice, the characteristic curve (solid line) representing the operation of the gapping gate is a smoothed approximation of the piecewise-linear characteristic curve (broken line) of the ideal case—the closer to the ideal curve, the better the gapping gate. E.g., by means of the gapping gate according to the U.S. Pat. No. 4,224,479 it is not possible to reach the ideal case very well. On the other hand, gapping gates based on the prior art "leaky bucket" principle are efficient because they are capable of handling also momentary bursts.

Figure 6:
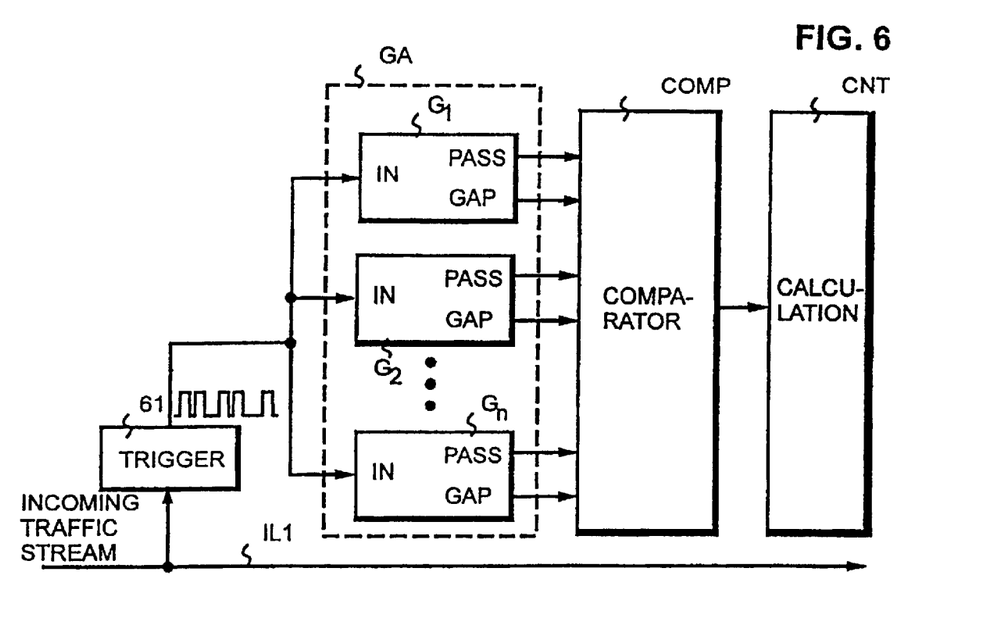
FIG. 6 shows a solution according to the invention for measuring traffic.

According to the present invention, the histogram information of traffic is measured by utilizing an array of gapping gates GA of FIG. 6, consisting of a multitude of parallel gapping gates $G_1, \ldots, G_n$. The incoming traffic stream (e.g. ATC cell stream) is also directed, in addition to being forwarded along input line IL1, to a measuring branch which is parallel to the input line. In the measuring branch, the traffic stream can first be applied to a trigger block 61, which generates a pulse per each incoming traffic unit. A pulse sequence thus obtained, representing the traffic measured, is applied to the inputs of all the gapping gates.

If it is assumed (a) that the variable |pass| depicts the number of traffic units (e.g. ATM cells or calls) passed by the gapping gate within a specific time interval d, and (b) that the gate received N traffic units in all during the time interval, the share of traffic units passed by the gate is |pass|/N. Hence, this represents an estimate of the probability that the frequency (arrival rate) r of incoming traffic units will be lower than or equal to U, i.e.:

$$\frac{|pass|}{N} \approx P\{r \leq U\}$$

By means of an individual gapping gate it is therefore possible to estimate (by counting the pass decisions made by the gapping gate, and the traffic units arriving at the gate) the value of the function H at the point r=U. The array of gapping gates will provide several values for the function H, and the values can then be used in calculating the estimates h. The calculation is carried out in a device according to FIG. 6 in a separate calculation unit CNT to which is fed information on the pass and gap decisions made by the array of gapping gates. However, it should be noted that if r>U and if its response curve is in accordance with FIG. 5, the gate will in any case pass (instead of zero traffic units) Ud traffic units. The resulting error is corrected in a comparator COMP between the array of gapping gates and the calculation unit, the operation of such a comparator being described in greater detail below.

To take an example, let us assume that there are only two gapping gates (to keep the example simple), and they have been activated for 100 seconds. The gates have different bound frequencies u: 5 and 10 traffic units per second. The decisions made by the gates will be stored; traffic, however, will not be affected in any way, but it is directed forward on the input line IL1. The results are as follows:

total number of calls 700 the first gate (U=5): pass=200, gap=500 the second gate (U=10): pass=600, gap=100.

The following conclusions can be drawn from the results. During the observation period, the average traffic rate was 700/100=7 traffic units per second. 200 traffic units, i.e. 28.5% of the total number, arrived at a rate less than 5 (traffic units per second), and 100 traffic units (i.e. 14.3% of the total amount) arrived at a rate higher than 10 (traffic units per second). The difference (500−100=400) between the gappings made by the first and the second gate corresponds to the number of traffic units that are within the range (5,10] (traffic units per second).

Figure 7A:
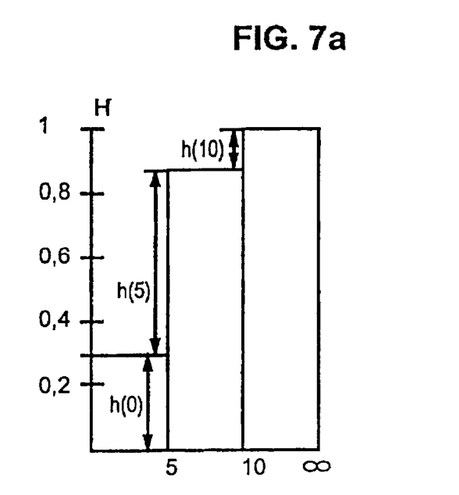
FIGS. 7a and 7b are histograms, with information corresponding thereto being possible to measure with the apparatus of the invention.
Figure 7B:
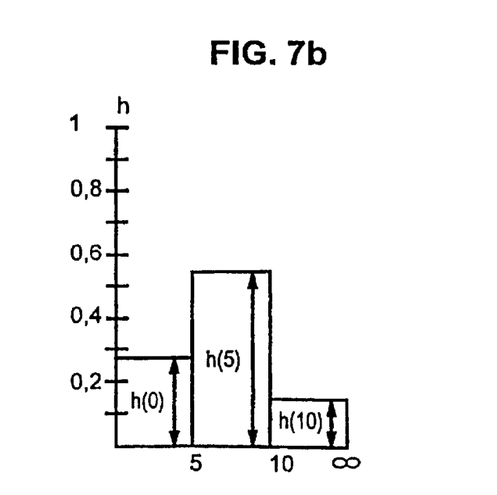

The histogram information obtained in the example above are illustrated in FIGS. 7a and 7b. FIG. 7a shows the estimate H for probability distribution function of traffic density, and FIG. 7b shows the estimate h for probability density function of traffic density. Estimate H has a form of a staircase with rises of size h(0) at the point x=0, h(5) at the point x=5, and h(10) at the point x=10. (Therefore, the values of estimate h can be calculated from the values of estimate H.)

With more gates, a more detailed picture will be obtained of the behaviour of the traffic. The following assumes that n gates are used, whose bound frequencies are denoted by reference marks U[1], U[2], . . . , U[n]. (U[1] is the lowest and U[n] the highest frequency). These n limit values determine (n+1) bands; the last band, i.e. (n+1), is between (U[n], ∞). The total number of gaps and passes by the gate whose index is i (i=1, 2, , . . . , n) is denoted by gap [i] and pass [i], whereby the counter counting the total number of traffic units is, in a way, an additional gate with a limit value of U[n+1[=∞, resulting in that pass [n+1]=N and gap [n+1]= 0. This means that the number of traffic units that are between (U[i−1], U(i)] is:

$$\text{gap}[i-1]-\text{gap}[i] \quad (1).$$

The number of traffic units between (U[i−1], U(i)] can also be calculated from:

$$\text{pass}[i]-\text{pass}[i-1] \quad (2).$$

It should additionally be taken into account that when the density of incoming traffic is higher than the gate limit value, a gate operating according to FIG. 5 will pass Ud traffic units, as noted above, i.e. not all the pass decisions have their basis in traffic with a rate lower than or equal to the gate limit value U. This estimation error is corrected by the comparator COMP, disclosed in FIG. 6, which after each traffic unit (or a pulse corresponding thereto) examines the outputs of the gates according to a descending limit value (i.e. starting with a gate having the highest limit value U) Having found the first gap result, the comparator changes the pass results present in all the remaining gates into gap results (because it is exactly these pass results that probably originate in traffic where r>U holds true). In this manner, most of these pass results that are "superfluous" from the point of view of the estimation result can be eliminated.

An individual gapping gate in the array of gapping gates of the invention may operate in a way (known per se) based on the prior art leaky bucket principle. Such a principle or a specific variation thereof is also referred to as Token Bank or Token Bucket. The principle of leaky bucket is disclosed e.g. in the reference Raif O. Onvural: Asynchronous Transfer Mode Networks, Performance Issues, Arctech House Inc., 1994 (ISBN 0-89006-662-0), Chapter 4.5.1. The leaky bucket principle is used e.g. by the GCRA algorithm (Generic Cell Rate Algorithm) of an ATM network UPC (Usage Parameter Control) function, the GCRA being used to supervise whether cell traffic is in accordance with the traffic agreement of the connection in question. For these parts, the method of the invention is able to utilize the solutions already present in the network.

Figure 8:
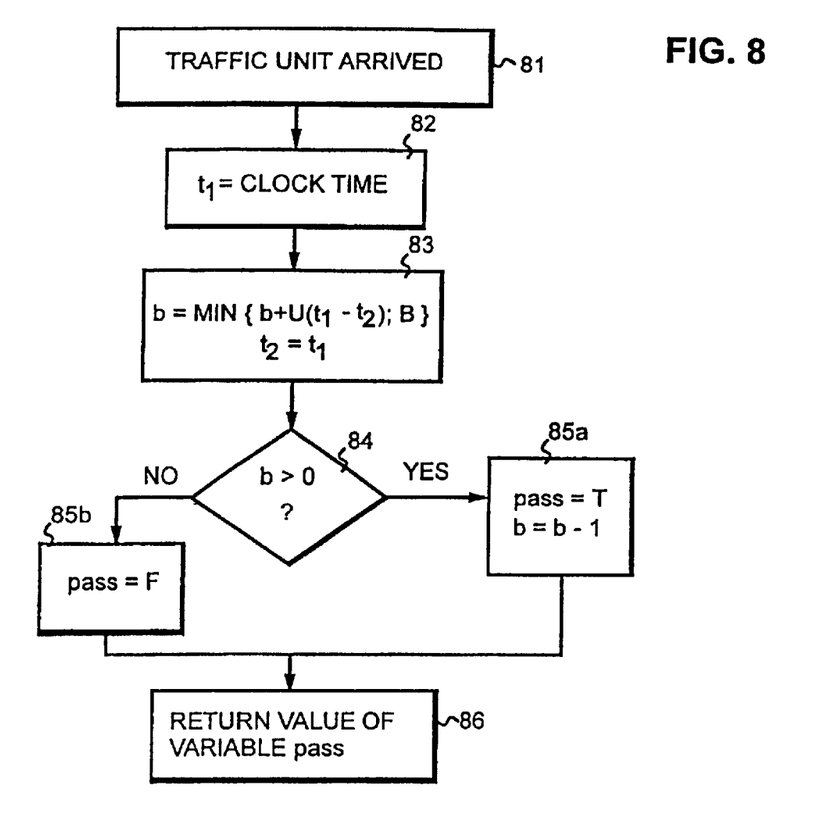
FIG. 8 is a flow chart illustrating the operation of an individual gapping gate illustrated in FIG. 6.

FIG. 8 illustrates, in block diagram form, the operation of a gapping gate based on the Token Bank principle. The gapping gate stores the following parameters in its memory:

time $t_2$ corresponding to the latest traffic unit (which is initially the same as the current time $t_1$), the gate limit value U (fixed value)

the bucket size B (fixed value), and bucket counter value b, representing the number of tokens in the bucket at any one time. Initially, b=0 but the number of "tokens" increases at a standard rate corresponding to the limit value U.

Upon receiving a new traffic unit (step 81), the gapping gate stores the current time in a variable $t_1$ (step 82). Following this, the gapping gate calculates a value for the quantity [Ux($t_1$−$t_2$) +b] compares it to value B and selects, for the variable b, the lower of these values. In addition, the gapping gate updates the value of the variable $t_2$ (step 83). Then, the gapping gate examines whether the variable b has a value higher than zero (step 84). If that is the case, the variable pass will be given the value true (T) and the value of the bucket counter will be decremented by one (step 85a). In case the counter value b is not higher than zero, the variable pass will be given the value false (F) (step 85b). Finally, the value of the variable pass will be returned, which means that the gate makes either a pass or a gap decision (the former if pass=T, and the latter if pass=F).

Figure 9:
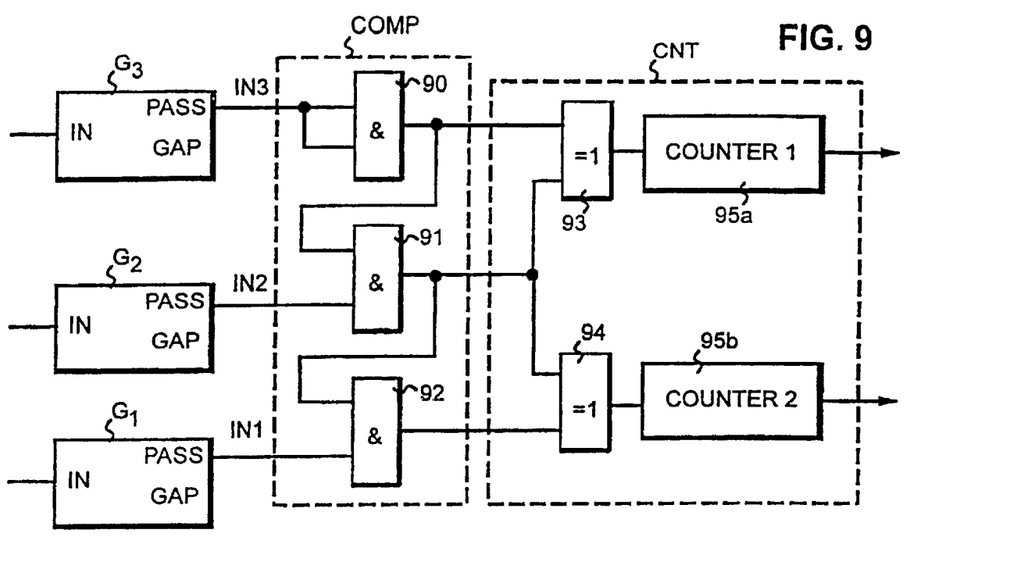
FIG. 9 shows a possible implementation of the apparatus illustrated in FIG. 6.

The comparator COMP and the calculation unit CNT may be implemented for example as shown by FIG. 9, illustrating an implementation utilizing three parallel gapping gates. The comparator inputs are marked by reference marks IN1, . . . , IN3. Input IN3 is coupled to the gate $G_3$ output PASS, input IN2 to the gate $G_2$ output PASS, and input IN1 to the gate $G_1$ output PASS. It is further assumed in the example that the gate $G_3$ limit value [U3] is higher than the gate $G_2$ limit value U[2], which is higher than the gate $G_1$ limit value U[1]. The output PASS of the gate with the highest limit value (i.e. the gate on the highest level) is coupled to both the inputs of a first AND gate 90, which in fact means that the output in question is connected directly to the comparator, i.e. the result in question is accepted as such. The gate $G_2$ output PASS is coupled to the first input of a second AND gate 91, the second input being coupled to the output of the AND gate corresponding to the gate ($G_3$) on the higher level. Similarly, the gate $G_1$ output PASS is connected to the first input of a third AND gate 92, the second input being connected to the output of the AND gate corresponding to the gate ($G_2$) on the higher level. The outputs of AND gates 91 and 92 produce the result "pass" only in case the output of the AND gate on the higher level provided the result "pass". This prevents a gate on the lower lever making a pass decision when a gate on the higher level makes a gap decision. By counting output pulses from AND gates 90, . . . , 92, an estimate will be obtained of the probability distribution function H.

By adding after the comparator part COMP e.g. a counter circuit CNT, implemented for example as in FIG. 9, an estimate of the probability density function h may be obtained. In this case, the outputs of the AND gates 90 and 91 are connected to the inputs of a first EXCLUSIVE OR gate 93 (respectively), and the outputs of the AND gates 91 and 92 are connected to the inputs of a second EXCLUSIVE OR gate 94 (respectively). The EXCLUSIVE OR gates only produce a pulse at their outputs when the logical values of the pulses at their inputs differ. As the gapping gate on the higher level has a higher limit value U, the logical values of the signals at the inputs of the gate 93 only differ in case gate $G_3$ made the decision "pass" and gate $G_2$ made the decision "gap", and, correspondingly, the logical values of the signals at the inputs of gate 94 only differ in case gate $G_2$ made the decision "pass" and gate $G_1$ made the decision "gap". If a counter (95a) is connected to the output of gate 93, it will provide a result which corresponds to the number of "pass"

decisions made by gapping gate $G_3$ subtracted by the number of "pass" decisions made by gapping gate $G_2$. Correspondingly, if a counter (95b) is connected to the output of gate 94, it will provide a result which corresponds to the number of "pass" decisions made by gapping gate $G_2$ subtracted by the number of "pass" decisions made by gapping gate $G_1$. Thus, counting takes place according to the formula (2) disclosed above.

Figure 10:
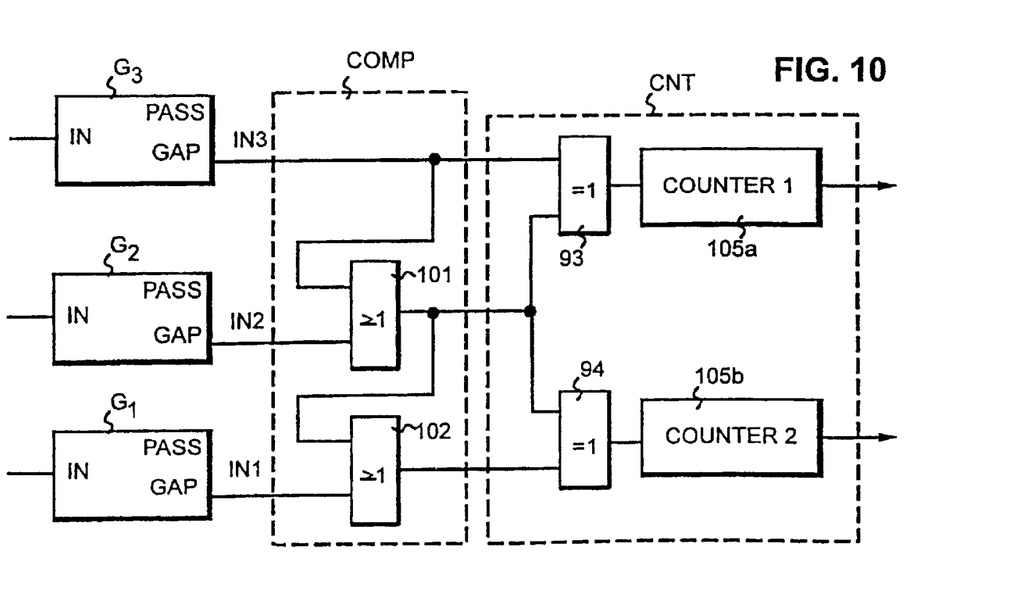
FIG. 10 shows a second possible implementation of the apparatus illustrated in FIG. 6.

The embodiment of FIG. 9 may be modified to operate based on "gap" decisions. Such an embodiment is shown in FIG. 10, which corresponds to the embodiment of FIG. 9 except for the fact that now the outputs GAP of the gapping gates are connected to the comparator inputs (the outputs GAP providing information on the gap decisions made), and instead of AND gates, OR gates 101 and 102 are used. The first counter (105a) in this case provides a result which corresponds to the number of "gap" decisions made by gapping gate $G_2$ subtracted by the number of "gap" decisions made by gapping gate $G_3$. Correspondingly, the second counter (105b) provides a result which corresponds to the number of "gap" decisions made by gapping gate $G_1$ subtracted by the number of "gap" decisions made by gapping gate $G_2$. Thus, the calculation takes place according to formula (1) disclosed above.

As demonstrated by the above, an individual gapping gate advantageously operates according to a method with a capability to smooth bursts of traffic, because this readily produces as efficient as possible an averaging effect (that is, the averaging is built-in in the gapping gate). The smaller the bucket size (B), the closer to the instantaneous the measured distribution will be.

Figure 11A:
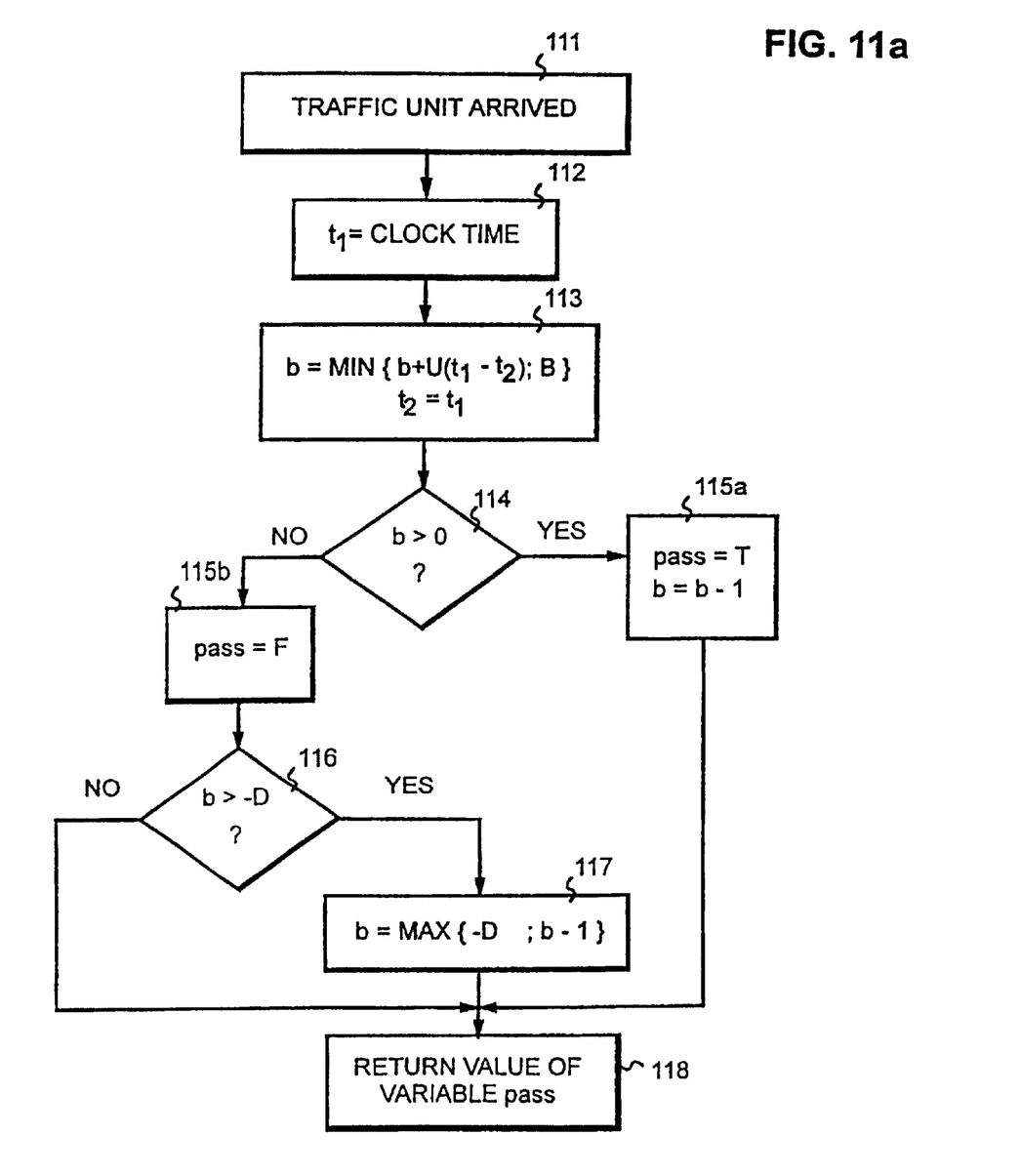
FIG. 11a is a flow chart illustrating how an alternative gapping gate operates.

According to a second embodiment of the invention, an individual gapping gate may be one modified from the above prior art solution, the operation of such a modified gapping gate being illustrated in FIG. 11a. The operation of this gapping gate corresponds to FIG. 8 except that in this case the number of tokens in the bucket may also be negative up to a predetermined point, herein denoted with the reference mark −D. This limit, then, is the minimum for the bucket counter.

Upon arrival of a new traffic unit (step 111), the gapping gate stores the current time in the variable $t_1$ (step 112). Following this, the gapping gate calculates a value for the quantity $[U \times (t_1-t_2)+b]$, compares it to the value B and selects, for the variable b, the lower of these values. In addition, the gapping gate updates the variable $t_2$ value (step 113). Then, the gapping gate examines whether the variable b has a value higher than zero (step 114). If that is the case, the variable pass will be given the value true (T) and the value of the bucket counter will be decremented by one (step 115a). In case the counter value b is not higher than zero, the variable pass will be given the value false (F) (step 115b). After this it is examined whether the counter value b is higher than the aforementioned predetermined value −D (step 116). If that is the case, the counter will, at the next stage, be selected the higher of the values −D and b−1 (step 117). Then, the value of the variable pass will be returned at step 118. If it is detected at step 116 that the counter value does not exceed −D (i.e. the counter has already reached its minimum value), the process proceeds directly to step 118, which is also reached directly from step 115a at which the variable pass obtained the value true (T).

In the modified gapping gate described above, the gapping gate has been altered towards low-pass operation so that it no longer passes Ud traffic units when the density of incoming traffic is higher than the gate limit value. This is due to the fact that as the traffic density exceeds the limit value U, the number of tokens unavoidably falls below zero. As long as that situation prevails, the gate will pass nothing. In other words, the number of tokens must first become positive before the gate begins to pass traffic units.

Figure 11B:
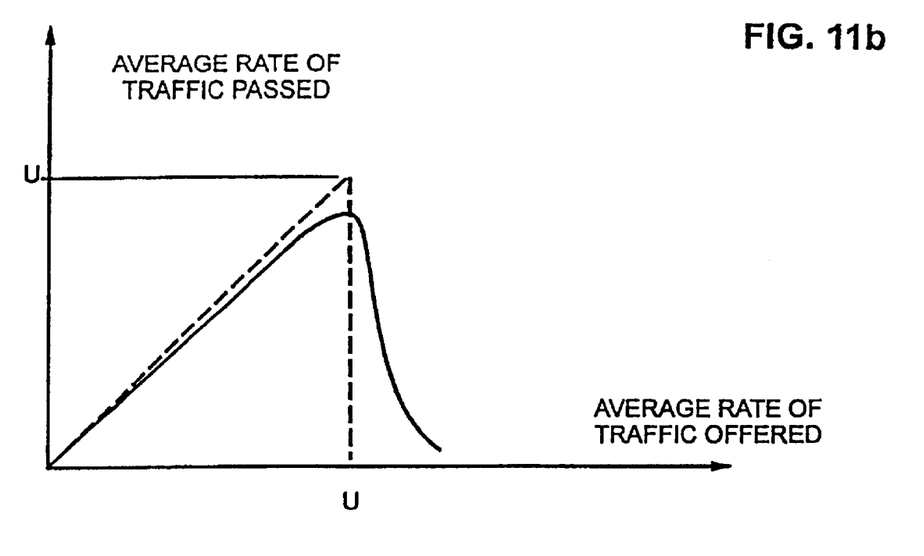
FIG. 11b illustrates a characteristic curve of the alternative gapping gate.

The operation of a gapping gate modified towards low-pass operation is illustrated in FIG. 11b. As the average amount of traffic offered exceeds the value in question, the gapping gate will in an ideal case gap all the traffic units (by directing them to the output GAP. The ideal case is represented by a broken line and a practical case by a solid line. In practice, the characteristic curve (solid line) representing the operation of the gapping gate is an approximation of the piecewise-linear characteristic curve (broken line) of the ideal case. The shape of the gapping gate characteristics curve also depends on how high a value is given for the constant D.

The leaky bucket or Token Bank principle can be illustrated in various ways depending on which variables are examined and which standpoint is chosen for the analysis. For example, it is not necessary to employ tokens but the resource employed may be time. As a result, the low-pass operation can be introduced in other control mechanisms operating according to a similar principle. These different variations are, however, not significant as far as the present invention is concerned, and therefore reference is made to a co-pending Finnish Patent Application 955407 relating to the gapping gate proper, and a corresponding PCT Application by Philip Ginzboorg and Tom Helenius, entitled "Traffic Control in a Communication System", filed Nov. 8, 1996 in the name of Nokia Telecommunications.

Figure 11C:
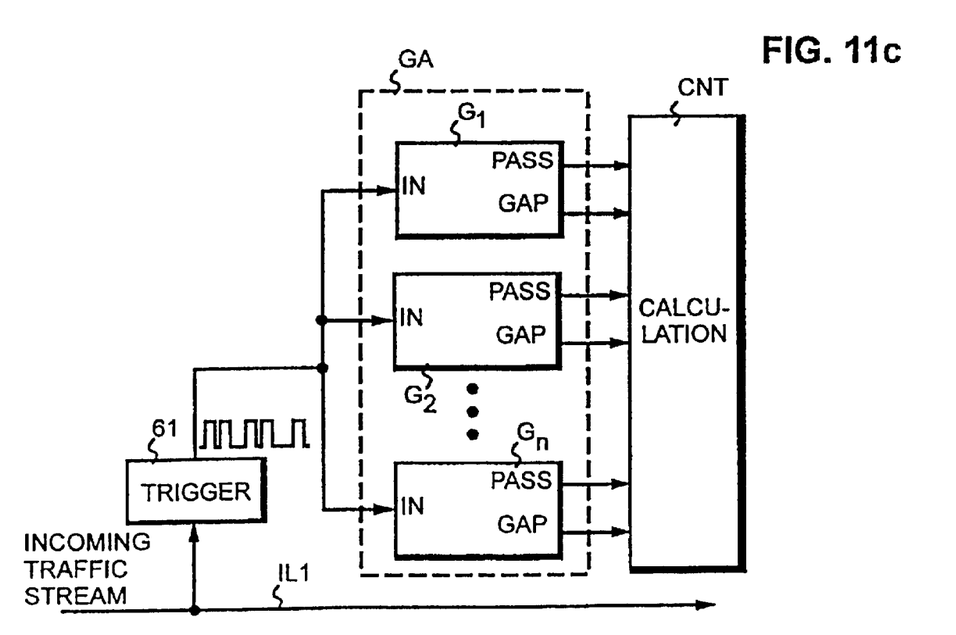
FIG. 11c shows a second solution according to the invention for measuring traffic.

As the internal operation of the modified gapping gate described above already takes into account the estimation error corrected in the above embodiment by the comparator COMP (cf. FIG. 6), a comparator is not necessarily required after the array of gapping gates if individual gapping gates operate in accordance with FIG. 11a. The device in such a case is as shown by FIG. 11c: it corresponds to the embodiment of FIG. 6 except that the comparator section may be omitted (the outputs of the gapping gates are connected directly to the counting unit inputs). (However, it should be noted that a comparator might prove useful even in an embodiment employing modified gapping gates.)

Figure 12:
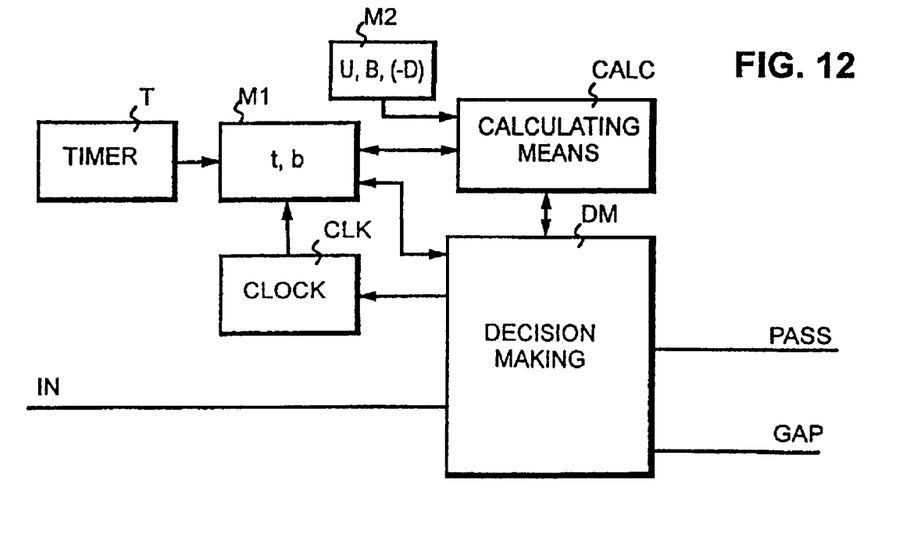
FIG. 12 is a block diagram illustration of an individual gapping gate.

FIG. 12 is a block diagram illustration of a gapping gate capable of operating in the ways described above. The core of the gapping gate is comprised of a decision-making unit DM which includes the aforementioned input IN and the aforementioned outputs PASS and GAP (cf. FIG. 4). The gapping gate further comprises a memory M1 for the variables ($t_1$, $t_2$ and b) as well as a memory M2 for the constant parameters. In a first embodiment, corresponding to the gapping gate according to FIG. 8, the memory M2 stores the parameters U and B. If the gapping gate is a low-pass gate of FIG. 11a, the memory M2 also stores, apart from the aforementioned parameters, the parameter −D. In addition to the memories, the gapping gate further comprises a calculating means CALC, a clock CLK and a timing means T, which add "tokens" to the bucket. Upon arrival of a new traffic unit, the decision-making unit DM controls the clock CLK to store the current time in the memory M1, after which it controls the calculating means CALC to calculate the variable b value and to store it in the memory M1. Comparing the variable b then takes place within the decision-making unit. Depending on the value of the variable b, the decision-making unit updates the correct variables as described above. Subsequently, the decision-making unit supplies a pulse either to the output PASS or the output GAP, depending on whether the traffic unit was passed or not.

The interval during which traffic measurement is carried out should depend on the traffic rate. The interval should be long enough in relation to the slowest possible traffic, advantageously at least two or three orders of magnitude higher than the inverse value of the lowest possible traffic rate. If the lowest possible rate is e.g. 2 units per second, the measuring interval should last 100×(½)=50 seconds, minimum. The duration of the measuring interval may also be linked to the number of traffic units.

The apparatus according to the invention may operate either in a continuous mode, which means that it repeats the measurement continuously, or in a one-time mode in which it stops after having performed the measurement. It is also possible to turn the apparatus on for a specific time of day, for example at peak hours.

Figure 13:
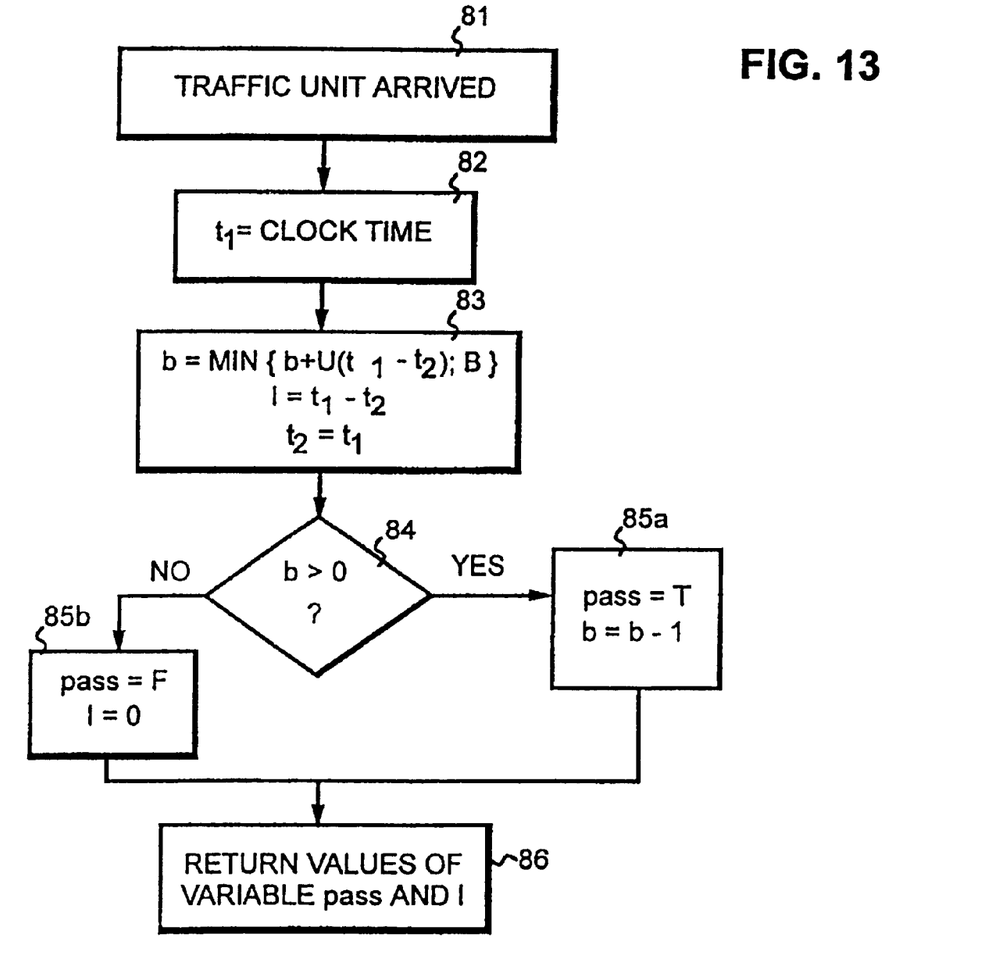
FIG. 13 is a flow chart illustrating the operation of a gate modified from the gapping gate of FIG. 8.
Figure 14:
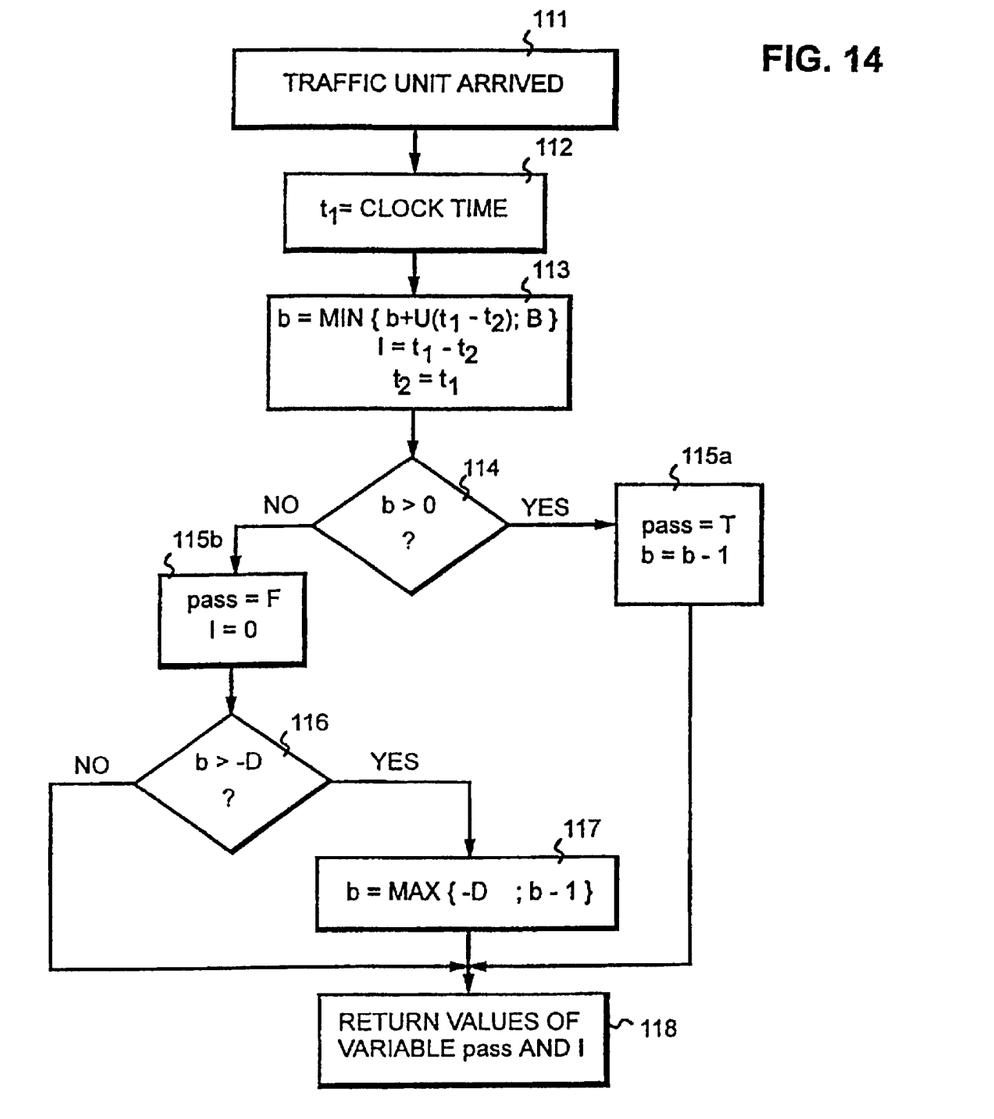
FIG. 14 is a flow chart illustrating the operation of a gate modified from the gapping gate of FIG. 8.

The method of the invention can also be utilized in finding out the distribution of those periods whose traffic rate r falls within a single measuring range. In order for this to be found out, the operation of the gapping gates has to be modified as illustrated by FIGS. 13 and 14. FIG. 13 illustrates the modification to be made to the gate according to FIG. 8, and FIG. 14 the modifications to the gate of FIG. 11a. In the modified gates, the difference between the arrival time of a passed traffic unit and the arrival time of the preceding traffic unit are measured, this difference being referred to with the term interarrival time and denoted by reference mark I in FIGS. 13 and 14. The measurement is carried out at step 83 (FIG. 13) or 113 (FIG. 14). If the traffic unit is not passed, I is zeroed at step 85b (FIG. 13) or 115b (FIG. 14). At step 86 (FIG. 13) and 118 (FIG. 14) the gate also returns the value of I. A counter after the gate sums the interarrival times (the values of I obtained from steps 86 and 118) of traffic units passed by each gapping gate during the measuring interval d. Reference mark a[1] is used to denote the sum of interarrival times ($1 \leq i \leq n+1$ and a[n+1]=d) passed during the measuring interval d by a gapping gate having a limit value U[1], and the reference mark T[1] is used to denote time during which the rate of the traffic source is within the range (U[i−1], U[1]]. It is consequently clear that T[i]=a[i]−a[i−1], i.e the final result is obtained as the difference between the sums measured by two adjacent gates.

An approximation may also be obtained of the values T[i] by calculating them from a histogram. Let us assume that the values according to the above formula (2) have during the measurement period d reached the value c[i]. Then, T[i]=c[i]/r[i], in which r[i] is a value within the range (U[i−1], U[i]]. The histogram does not provide the value of r[i], but it can be approximated in a multitude of ways. The approximation can be carried out e.g. by assuming that r[i] equals the highest value U[i] on the band. This results in that T[i]≈c[i]/U[i], in which $1 \leq i \leq n$. The time T[n+1] spent on the latest band can consequently be obtained from:

$$T[n+1] \approx d - [T[1]+T[2]+T[3]+ \ldots +T[n]].$$

Another way of approximating r[i] is to define it as the mean of the band. Accordingly, T[i]≈2c[i]/(U[i−1]+U[i]), in which $1 \leq i \leq n$. It is clear that the wider the range is the worse the approximation will be. By measuring the values T[i] directly as described above, an accurate estimation will be obtained regardless of how wide the bands are.

On the basis of the above, it is also obvious that by measuring both the distribution h (histogram) and the distribution of time periods, r[i] can be calculated, i.e. the rate at which the majority of traffic units on the band (U[i−1], U[i]] arrived during the measuring period d. As regards the rate, $$r[i]=c[i]/T[i] \quad (3)$$

holds true.

If there is no traffic on the i band, i.e. if c[i] and T[i] are zero, r[i] can be given a value from the center of the band:

$$r[i]=(U[i-1]+U[i])/2 \quad (4).$$

(This rule is applicable also when c[i]>0, if c[i] is very low compared to the total number N of traffic units, e.g. if c[i]/N<$10^{-3}$).

As can be seen from FIG. 11b, the characteristics of the filter are the further from the ideal case the closer r is to the value U. The measurements carried out by the gate are therefore the least accurate when r[i] is close to U[i]. Thus, if the distribution of the rate axis can be changed at each measurement period, it is advantageous to arrange the band limits U[i] so that the values r[i] measured earlier are as far as possible from the limit values U[i]. The limit values of the bands can consequently be rearranged by selecting at the end of each measuring period new values U[i] as follows U[i]= (r[i−1]+r[i])/2, in which i=1, 2, . . . , n and the values r[i] have been obtained from the equations (3) and (4) on the basis of measured histogram information c[i].

The method described above may also be utilized in charging: different charging may be used for different traffic rates, or a consistent charge may be applied up to a specific rate.

Although the invention is in the above described with reference to the examples in the accompanying drawings, it is obvious that the invention is not restricted thereto but it may be varied within the inventive idea set forth above and in the attached claims. Although the above and the attached claims use as an example a situation in which a pulse sequence illustrating traffic is applied to the array of gapping gates, the actual traffic stream may also be fed to the measuring branch in addition to the alternative that it may be forwarded on its normal route. The measuring process can also be incorporated in the same elements that actually also gap traffic, although it is more advantageous (simpler) to carry out measurements fully independently as described in the above example. The detailed implementation of the optional comparator and the counter circuit may vary in different ways without departing from the basic idea of the invention.

What is claimed is:

1. A method for measuring traffic in a communication system, the method comprising:
   directing information corresponding to traffic units to be forwarded to a number of parallel traffic gapping gates ($G_1$, . . . , $G_n$) which make a gap or pass decision on individual traffic units,
   estimating a distribution concerning frequency of occurrence of the traffic units by simultaneously calculating the estimates of a relative frequency of occurrence on several value ranges, and
   calculating the estimate of an individual value range on the basis of differences between the number of decisions made by the parallel traffic gapping gates corresponding to the value range in question during a specific time interval.

2. The method as claimed in claim 1, wherein the calculation is carried out solely on the basis of pass decisions made by the gapping gates ($G_1$, . . . , $G_n$).

3. The method as claimed in claim 1, wherein the calculation is carried out solely on the basis of gap decisions made by the gapping gates ($G_1$, . . . , $G_n$).

4. The method as claimed in claim 1, wherein predetermined time is used as said time interval.

5. The method as claimed in claim 1, wherein a predetermined number of received traffic units is used as said time interval.

6. The method as claimed in claim 1, wherein an individual gapping gate utilizes a method based on a leaky bucket principle for generating pass and gap decisions.

7. The method as claimed in claim 1, wherein an individual gapping gate measures the difference between an arrival time of a passed traffic unit and an arrival time of the preceding traffic unit, and calculating, on the basis of these differences, the relative time (T(i)) spent by a traffic source on an individual value range.

8. The method as claimed in claim 1, wherein said number of differences is also utilized in approximating a relative time spent by a traffic source on an individual value range.

9. The method as claimed in claim 1, wherein a part of pass decisions concerning a traffic unit is forced to be consistent with a gap decision made by a specific, selected gapping gate, wherein said part is selected on the basis of the gapping criteria (U) employed by the selected gapping gate.

10. The method as claimed in claim 1, wherein a low-pass gate is used as the gapping gate, the low-pass gate seeking to gap all traffic as the traffic unit density reaches a specific limit.

11. The method as claimed in claim 7, wherein a limit value whose exceeding leads to the gapping gate beginning to gap traffic units is automatically changed in the gates of the array of gapping gates when shifting from one measuring period to another.

12. The method as claimed in claim 11, wherein new limit values are chosen on the basis of estimates of a relative frequency of occurrence (c[i]) and the calculated relative times (T[i]) .

13. An apparatus for measuring traffic in a communication system, the apparatus comprising:

a number of parallel gapping gates ($G_1, \ldots, G_n$), each receiving information corresponding to traffic units to be forwarded, and each gapping gate comprising a decision-making device for making a pass or gap decision on a traffic unit forwarded within a system, wherein a pass decision indicates accepting the traffic unit as traffic fulfilling predetermined criteria, and a clock device for determining the time of occurrence for each traffic unit, and a calculating device for calculating the differences between the number of decisions made by single gapping gates within a specific period.

14. The apparatus as claimed in claim 13, wherein the calculating device comprises a number of parallel counters, an individual counter counting the difference between the number of pass decisions made by two gapping gates.

15. The apparatus as claimed in claim 13, wherein the calculating device comprises a number of parallel counters, an individual counter counting the difference between the number of gap decisions made by two gapping gates.

16. The method as claimed in claim 1, wherein the traffic unit is at least one of a cell, a packet, and a call.

17. The apparatus as claimed in claim 13, wherein the traffic unit is at least one of a cell, a packet, and a call.

* * * * *